G. R. CLARK.
AUTOMATIC TIME SWITCH.
APPLICATION FILED NOV. 14, 1908.

1,101,998.

Patented June 30, 1914.
7 SHEETS—SHEET 5.

G. R. CLARK.
AUTOMATIC TIME SWITCH.
APPLICATION FILED NOV. 14, 1908.

1,101,998.

Patented June 30, 1914.
7 SHEETS—SHEET 6.

G. R. CLARK.
AUTOMATIC TIME SWITCH.
APPLICATION FILED NOV. 14, 1908.

1,101,998.

Patented June 30, 1914.
7 SHEETS—SHEET 7.

UNITED STATES PATENT OFFICE.

GEORGE R. CLARK, OF DAYTON, OHIO, ASSIGNOR TO CLARK & HARVEY, OF DAYTON, OHIO, A FIRM COMPOSED OF GEORGE R. CLARK AND THOMAS J. HARVEY, OF DAYTON, OHIO.

AUTOMATIC TIME-SWITCH.

1,101,998.   Specification of Letters Patent.   Patented June 30, 1914.

Application filed November 14, 1908. Serial No. 462,668.

*To all whom it may concern:*

Be it known that I, GEORGE R. CLARK, a citizen of the United States, residing at Dayton, in the county of Montgomery and State of Ohio, have invented certain new and useful Improvements in Automatic Time-Switches, of which the following is a specification.

My invention relates to improvements in electric switches and especially relates to switches of the type set forth in my Letters Patent No. 944,319, issued December 28, 1909.

The object of my invention is to simplify the construction and make more effective the operation of the devices set forth in said patent.

A further object of the invention is to provide a registering device for registering the number of hours which the lights in the circuit controlled by the switch are burned.

The invention consists in the constructions and combination of parts hereinafter described and set forth in the claims.

In the accompanying drawings.

Like parts are represented by similar characters of reference in the several views.

1 represents the base of the main frame of the machine.

2 is a supporting plate for certain of the parts, supported above the base by the vertical rods 3 3.

4 is a support of insulating material, supported by the plate 2 by the uprights 5 5.

6 is a supporting column located centrally on the plate 4.

Figure 1:
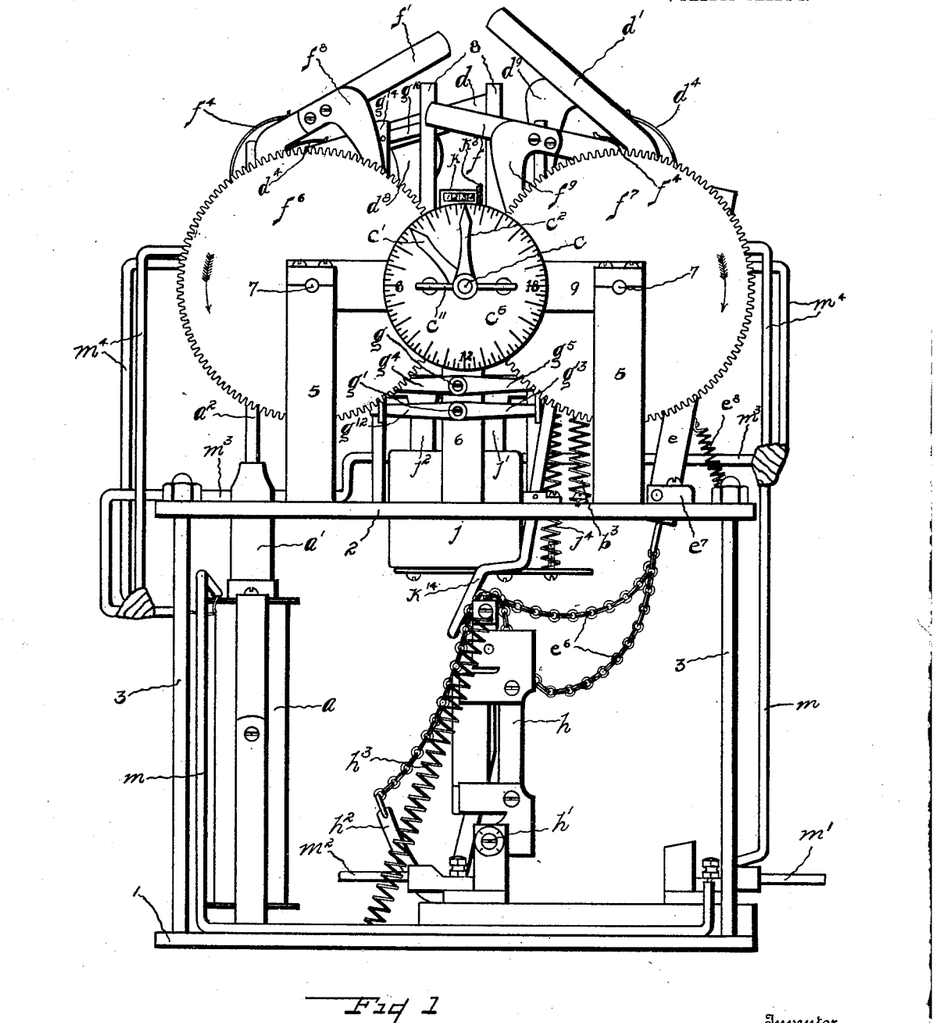
Figure 1 is a front elevation of a device embodying my invention.
Figure 3:
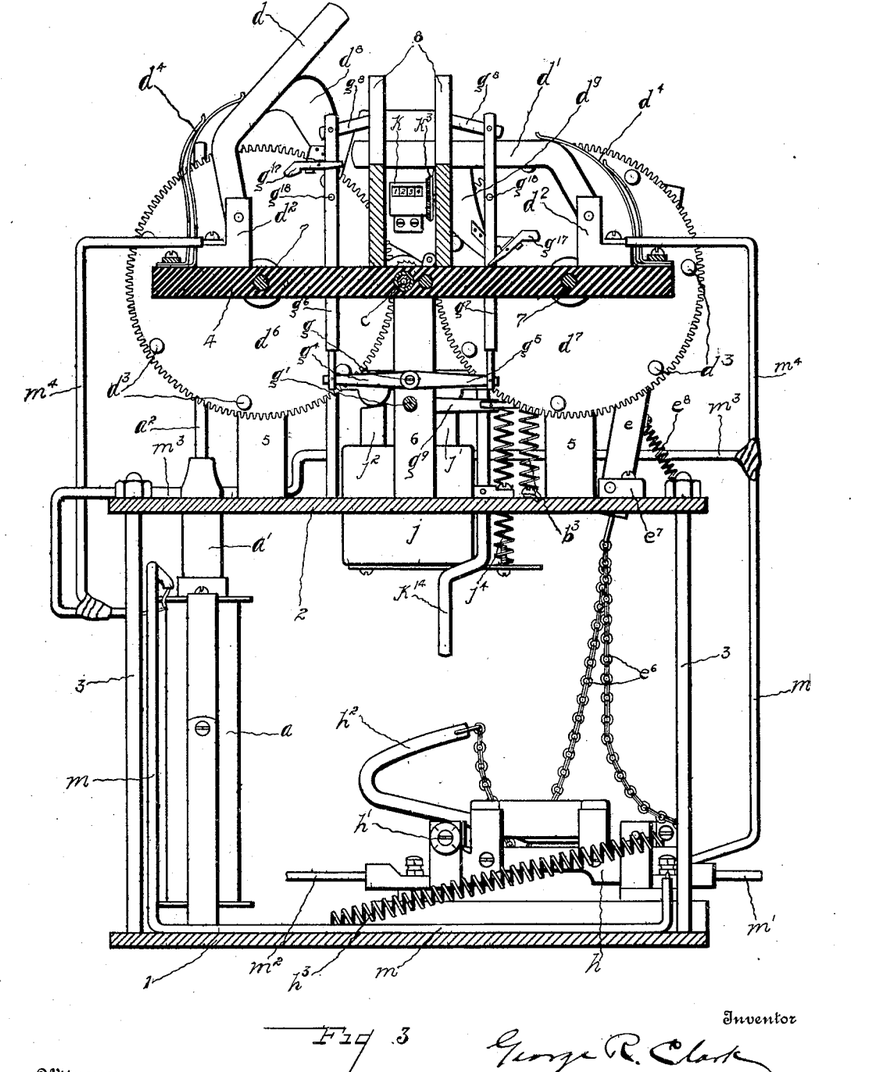
Fig. 3 is a vertical longitudinal sectional view on the line $x\ x$ of Fig. 2.
Figure 4:
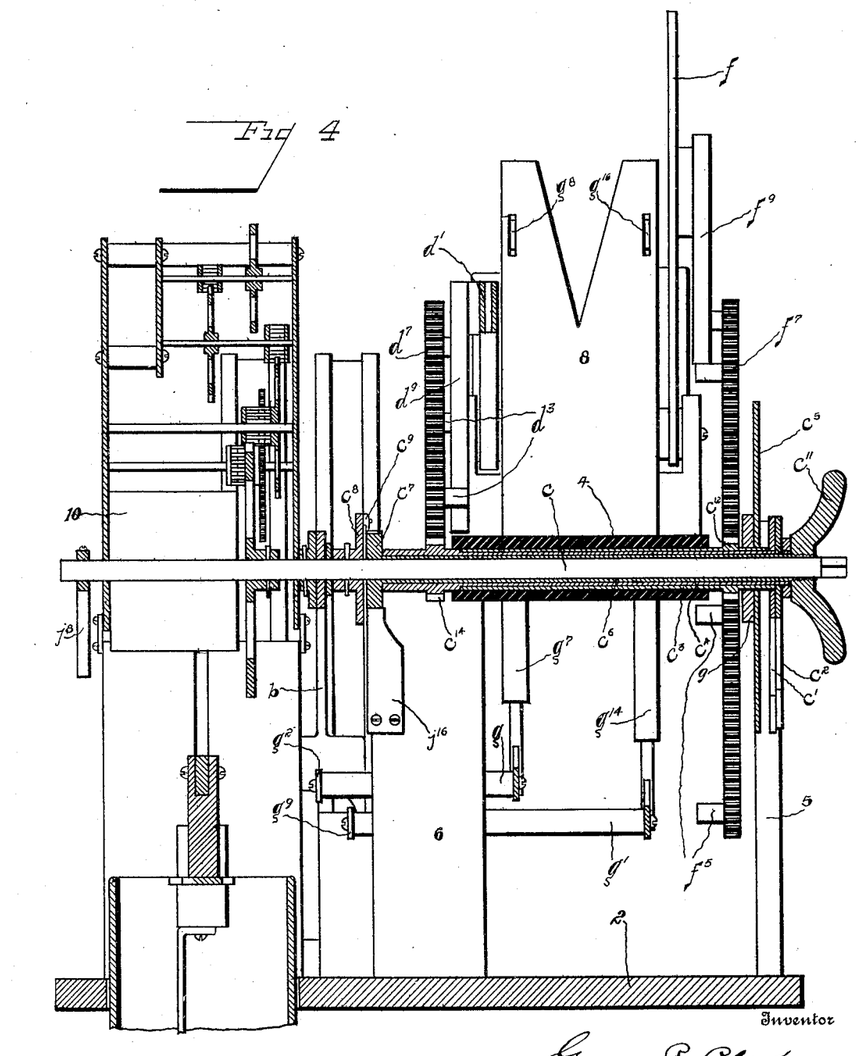
Fig. 4 is a vertical transverse sectional view on the line $y\ y$ of Fig. 3, only the parts above the supporting plate, 2, however, being shown.
Figure 7:
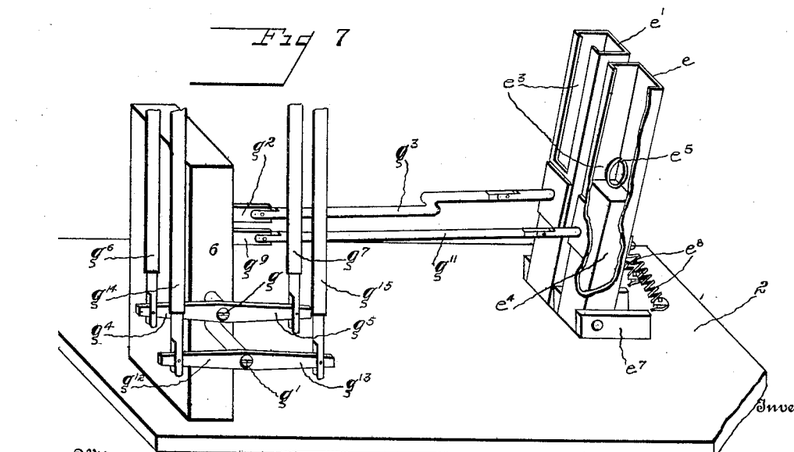
Fig. 7 is a detail in perspective of some of the operating parts.

*Main operating devices.*—As in my previous patent referred to, I employ in the present machine a main operating device in the nature of an electric magnet or solenoid, $a$, suitably supported on the base, 1, of the machine. (Figs. 1 and 3.) The movable core, $a^1$, of this solenoid is pivoted, through the medium of the rod, $a^2$, to the main operating lever, $b$, fulcrumed upon a motor shaft, $c$, (Fig. 4). The lever is extended beyond said shaft and this end is normally drawn down by a spring $b^3$, connected to the frame plate 2, so as to draw the movable core of the solenoid upwardly and normally maintain it in this position. The free end of the lever is provided with two hooked ends, $b^1\ b^2$, which stand in line with and in close proximity to slotted openings, $e^3$, in two tilting frames or casings, $e\ e^1$, which contain movable plungers $e^4$, having eyes, $e^5$, at their upper ends (see Fig. 7 for detail), these plungers being connected by chains, $e^6$, to the movable member of the main switch, as more fully described hereinafter, so that at certain times when the main lever, $b$, is operated by the solenoid, and one of the plunger casings tilted by means hereinafter described, the main switch will be opened or closed; a more complete and detailed description of the devices for operating the solenoid and the tilting frames or casings being as follows:

*Auxiliary switches.*—The solenoid is located in a circuit, $m\ m$, connected to the main supply circuit, $m^1$, $m^2$ representing the consumption circuit. Also located in branches $m^4$, of this circuit, $m\ m$, are two auxiliary switches, controlled by the timing mechanism, to close said circuit so as to cause an electrical impulse, through said solenoid at given intervals of time, one of these auxiliary switches being controlled by the timing mechanism to close the main switch and the other auxiliary switch controlled by the timing mechanism to open the main switch.

Figure 2:
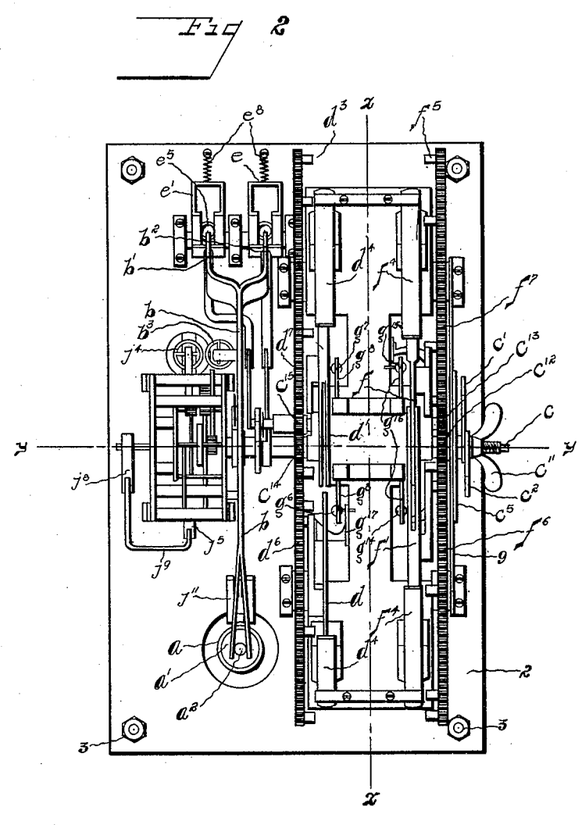
Fig. 2 is a top plan view of the same.
Figure 6:
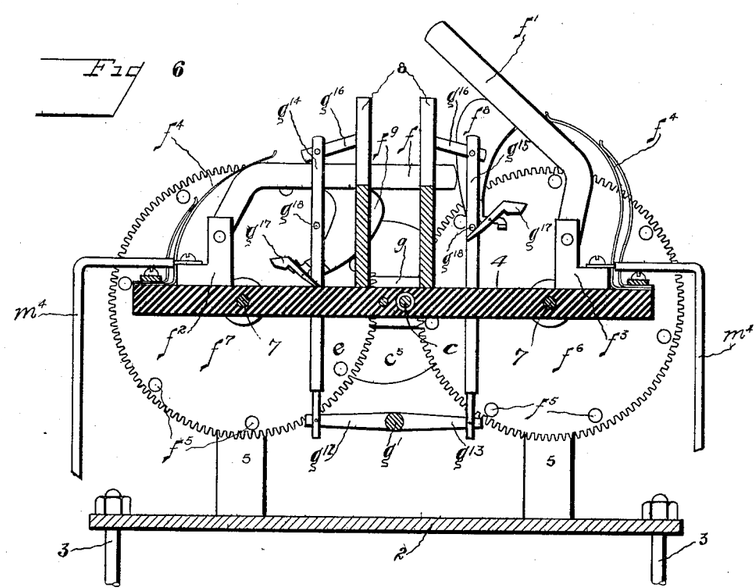
Fig. 6 is a vertical longitudinal sectional view of the upper part of the device, this section being also taken on the line $x\ x$ of Fig. 2 but looking in the opposite direction.

In Fig. 3 is illustrated the auxiliary switch and plunger connecting devices controlling the closing of the main switch. $d$ and $d^1$ (Fig. 3) represent two movable contacts of conducting material, each pivoted to a binding post, $d^2$, $d^2$ on the insulated frame part, 4, to which the wires of the branches, $m^4$, of the circuit, $m\ m$, are connected. The free end of one of these contacts, for instance the one, $d^1$, (Fig. 2)

is bifurcated, and at certain times either one or the other of these arms will drop, being urged downwardly by the spring, $d^4$, the outer end of the arm, $d$, passing between the bifurcated portions of the other arm so as to make a contact and establish the circuit through the solenoid, this contact being but for an instant so that the circuit will be immediately broken. The dropping of the arm will also rock the tilting frame, $e^1$, so as to bring its plunger in position to be engaged by one of the hooks of the operating lever in the manner hereinafter more fully described. The bifurcated portions of the arm, $d^1$, are more or less resilient so that as the free end of the other arm passes between them it will form a close contact therewith. Each of the arms will drop every forty-eight hours, one of the two dropping, therefore, alternately with the others every twenty-four hours. The arms are raised by pins, $d^5$, on the gears, $d^6$, $d^7$, which are constructed of insulating material; seven of these pins being provided for each gear wheel, which gear wheel revolves once each fourteen days; these pins being spaced equidistant apart and projecting laterally therefrom. Each of the arms has a downwardly projecting cam-projection thereon of insulating material, indicated by $d^8$ $d^9$, which lie in the path of movement of the respective projections. The gears revolve toward each other in the direction of the arrows, each gear revolving once every fourteen days, the distance between the pins representing a movement of forty-eight hours. After one of the arms has dropped, say, for instance, the one, $d^1$, the cam-projection thereon will be engaged by one of the pins on the gear $d^7$ and gradually raise the arm $d^1$ against the tension of its spring. When the arm has reached a point mid-way between its lowermost and uppermost position, the other arm, $d$, will be released by the pin on the other gear which has last raised it, and, dropping, will form a contact with the arm $d^1$ and thus establish a circuit through the solenoid. The arm, $d$, then will be gradually raised by one of the projecting pins of the gear, $d^6$, will be contacted mid-way by the dropping arm, $d^1$, and finally raised to its uppermost position and dropped again when released by the pin riding off the cam-shaped portion, $d^8$, thereof. The other auxiliary switch, that is, the one for opening the main switch, (see Fig. 6) is constructed exactly like the one just described, hence a further description of its operation is not necessary, but in order to distinguish its parts from the one just described, I have indicated the various parts of this latter switch by the reference characters, $f$, $f^1$, $f^2$, etc.; $f$ $f^1$ representing the contact arms or members of the auxiliary switch; $f^2$ $f^3$ the binding posts to which the arms are pivoted and to which the circuit wires $m$ $m$ are attached, it being understood that the circuit $m$ $m$ is divided into branches $m^4$, as before stated, with one auxiliary switch in one half and the other auxiliary switch in the other half; $f^4$ $f^4$ are the springs; $f^6$ $f^7$ are the gear wheels having the pins, $f^5$; and $f^8$ $f^9$ are the cam-shaped projections attached to the contact arms.

The respective gear wheels, $d$ $d^1$ $f$ $f^1$, are journaled loosely upon rods or shafts, 7, 7, on the respective sides of the insulating support, 4, and between the same and the uprights, 5 5; these rods or drafts also serving the purpose of connecting the said insulating support to the uprights. These gears are driven from a clock motor mechanism supported in a suitable frame, located on the plate, 4. This clock mechanism may be of any ordinary type but is preferably of the spring type, the main spring, 10, of which is connected to the shaft or arbor, $c$, so as to revolve it once each twenty-four hours in the ordinary way. Two index hands, $c^1$ $c^2$, are secured, respectively, to loose telescoping sleeves, $c^3$ $c^4$, the hands coöperating with a dial, $c^5$, secured to the frame piece, 9. Within these sleeves is another loose sleeve, $c^6$, on the arbor, having a ratchet, $c^7$. Secured to the arbor adjacent the ratchet $c^7$ is a disk $c^8$, carrying a spring-pressed pawl, $c^9$, which engages with the ratchet $c^7$ in the forward rotation of the arbor but permits the arbor to turn backwardly for winding purposes independently of the ratchet $c^7$. After the hands have been set to the proper position on the dial the sleeves are all securely clamped together by the thumb-nut, $c^{11}$; the end of the outer sleeve abutting against a shoulder on the sleeve $c^4$, and the sleeve $c^4$ abutting against the ratchet $c^7$ of the inner sleeve $c^6$. The outer sleeve $c^3$, carries a pinion, $c^{12}$, meshing with the gear $f^6$ and also driving an intermediate pinion or gear $c^{13}$ meshing with the gear, $f^7$, (Fig. 2). The sleeve $c^4$ carries a pinion, $c^{14}$, meshing with the gear, $d^6$, and also driving the gear, $d^7$, through the medium of the intermediate pinion or gear $c^{15}$. All of these parts are supported by the frame pieces, 5, 6 and 7.

By the construction thus far described it will be seen that once every twenty-four hours one of the auxiliary switches will be closed for a very brief period by the operation of the large gear wheels and their pins so as to send an impulse through the solenoid, draw down one end of the main operating lever and elevate the hooked end. Now, if either one of the tilting frames should be tilted forwardly at the time the lever operates, it will be seen that the hooked end will engage the eye of the plunger and elevate the plunger so as to open or close the main switch. I have therefore provided means operated by the respective members of the auxiliary switch adapted to tilt either one of the frames when the arm drops so that the frame will be tilted simultaneously with the closing of the circuit and therefore simultaneously with the operation of the main lever. The devices for accomplishing this are shown best in Figs. 6 and 7. Journaled in the supporting piece, 6, are two crank-shafts $g$ and $g^1$. The crank-shaft, $g$, has at one end a crank, $g^2$, which is pivotally connected to the tilting casing, $e^1$, through the medium of the off-set link, $g^3$. The other end of the crank-shaft, $g$, has oppositely extending cranks, $g^4$ $g^5$, to the outer ends of which are pivoted vertically extending rods, $g^6$ $g^7$, held and caused to move in a vertical direction by the pivoted check-rods, $g^8$, at their upper ends; said check-rods being pivoted to the upwardly extending frame members 8. The shaft, $g^1$, is likewise connected to the tilting frame, $e$, through the medium of its crank, $g^9$, and the link, $g^{11}$, pivotally connected to the crank and also to the frame. The other end of the shaft has oppositely-extending crank-arms, $g^{12}$ and $g^{13}$, having pivoted thereto the vertically-extending rods, $g^{14}$ and $g^{15}$, having the pivoted check-rods, $g^{16}$, at their upper ends. Each of the auxiliary switch members is provided with a pivoted weighted pawl, $g^{17}$, preferably located on the lower part of each one of the cam-shaped projections, $d^8$ $d^9$ $f^8$ $f^9$, and on each one of the vertically-extending rods, $g^6$ $g^7$ $g^{14}$ $g^{15}$, is a laterally-extending pin, $g^{18}$, lying in the path of movement of the respective pawls. In the upward movement of the arms, $d$, $d^1$, $f$, $f^1$, these pawls will freely pass the respective pins, but so soon as one of the arms is released in the manner before described the pawl thereon will strike the pin corresponding thereto and hence, through the connections described, tilt one of the frames, $e$ or $e^1$, forward to bring its plunger in the path of movement of the main operating lever, which begins to move upwardly instantly, carrying with it the plunger. It will be understood that the location of the respective pins will be such that the tilting operation and the establishment of the circuit through the solenoid will be practically simultaneous. The frames or casings, $e$ and $e^1$, are pivoted to ears or lugs, $e^7$, on the supporting plate 2 and the lower parts thereof extend through apertures in said plate. Springs, $e^8$, normally hold said frames or casings back out of the path of movement of the hooked ends of the main operating lever and also hold the vertical rods in their uppermost position, the tilting of the frames being against the tension of these springs. These springs also serve as the means for disengaging the plunger from the lever at the completion of the movement of the lever by pulling the eye off from the hooked end.

*Main switch.*—As before stated, the plungers of the tilting frames, $e$ and $e^1$, are connected to the movable member of the switch by chains, $e^6$. The main switch which I employ is of the standard knife type, $h$ representing the movable member thereof, pivoted at $h^1$. One of the chains is connected to the front end of the movable member and the other chain to the rearwardly-extending bent arm, $h^2$, as in my prior patent referred to. Connected to the front end of the movable member of the switch and extending back slightly beyond and below the pivoted point thereof is a coil spring, $h^3$. This spring acts to assist the throw of the switch in either direction after it has been started by the plungers. For instance, as shown in Fig. 1, after the switch has passed the center of its opening movement the spring exerts its influence in a direction on the opening side of the pivotal point of the switch, and, as shown in Fig. 3, after the switch has passed the center the spring will exert its influence on the closing side of the pivotal point of the movable member, in a manner which will be well understood.

Figure 5:
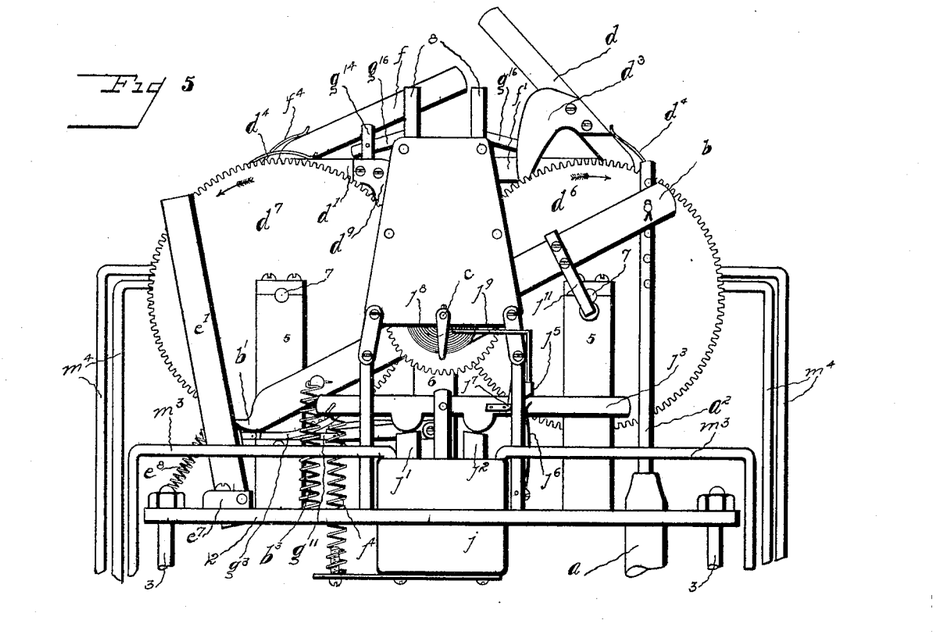
Fig. 5 is a rear elevation of the upper part of the device. Fig. $5^a$ is a detail of the winding mechanism.
Figure 5A:
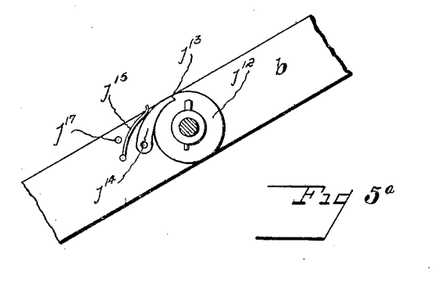

*Automatic winding of clock motor.*— Means are provided for automatically winding the motor by the electric current. This winding is accomplished by the operation of the main lever, $b$, but in order that the motor may be wound at more frequent intervals than at just such times as the lever may be operated to open and close the main switch, I have provided secondary means for sending an impulse through the solenoid and thereby operate the lever at intervals of, say, every two or three hours. Located in the circuit, $m^3$, which runs from the wires, $m$ $m$, through the solenoid is a secondary auxiliary switch, $j$, of any usual and ordinary type, having movable members $j^1$ $j^2$. Pivoted above these movable members is a lever, $j^3$, one end of which is connected to a spring, $j^4$, tending to draw this end downwardly. Located in the frame work is a spring-pressed catch, $j^5$, normally spring-pressed into engaging position by the spring, $j^6$, and adapted to engage the projecting shoulder, $j^7$, of the lever, $j^3$, and retain same in the position shown in Fig. 5 against the tension of the spring, $j^4$. Connected to the arbor, $c$, is a projection, $j^8$, and connected to the catch, $j^5$, is a projecting rod, $j^9$, extending into the path of movement of the projection $j^8$. As the arbor revolves this projection, $j^8$, will contact the rod so as to release the lever from the catch and permit the end thereof to descend under the influence of the spring, $j^4$, pushing down the member $j^1$ of the switch and thus closing the circuit through the solenoid. This causes the core to descend, drawing down the main operating lever, $b$. Located on the main operating lever is a projecting arm, $j^{11}$, carrying a friction roller at its lower end, and one end of the lever, $j^3$, lies in the path of movement of this arm so that as the main operating lever, $b$, descends the arm, $j^{11}$, will contact the lever $j^3$ and swing the same against the tension of its spring until the shoulder thereon is again engaged by the spring-pressed catch. This movement also pushes down the switch member, $j^2$, which opens the switch, $j$, and hence the circuit through the solenoid; it being understood that the two switch members are connected together at their lower ends so that the descent of one will cause the other to rise and vice versa. The projection, $j^8$, is adjustable on the arbor so that it can be set to trip the switch at any interval of time desired so that it will be seen that the main operating lever can be operated as often as desired independent of the two auxiliary switches previously described. As before stated, the main operating lever, $b$, is hung loosely upon the arbor or shaft, $c$. Fixed to the arbor, $c$, adjacent the lever, $b$, is a collar, $j^{12}$, (Fig. 5$^a$) having a shoulder, $j^{13}$, and located on the lever, $b$, is a projection, $j^{14}$, adapted to engage the shoulder $j^{13}$ every time the main operating lever is operated, so as to turn the arbor back to its initial starting point and hence wind up the clock motor mechanism. The projection, $j^{14}$, on the lever is shown in the nature of a pivoted pawl, and a spring, $j^{15}$, is provided to hold this pawl into engaging position so that at any time it is desired to throw out of operation the electric clock winding mechanism, and wind by hand, this may be done by throwing the spring back of the small pin, $j^{17}$, and swing the pawl out of engaging position, where it will be held by friction or otherwise; and in this event the projection $j^8$ will also be removed so as to prevent the secondary switch from closing. In order that the sleeves, $c^3$ $c^4$ and $c^6$, may be held against backward rotation by friction when the winding operation takes place, I provide a spring-pressed pawl, $j^{16}$, engaging the ratchet wheel, $c^7$, so as to permit the forward rotation thereof but prevent the same from turning backward, in a well known manner.

*Hand wind.*—If desired, instead of winding the motor by the electrically-operating devices, it may be wound by hand, the end of the arbor being formed square to receive a key, as shown. In this case the connections before described between the main operating lever and the arbor will be broken.

*Registering mechanism.*—This mechanism is for the purpose of registering the number of hours the lights burn, the mechanism being adapted to be thrown into and out of engagement with its operating device by the opening and closing of the main switch.

Figure 8:
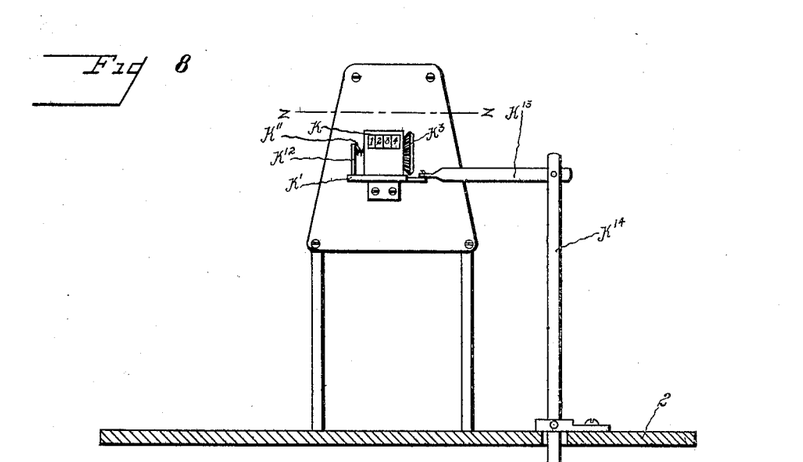
Fig. 8 is a side view in detail of the registering mechanism.
Figure 9:
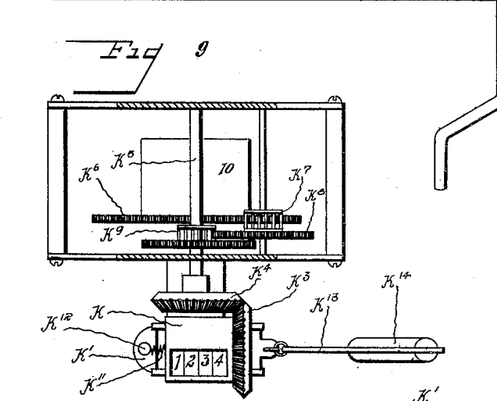
Fig. 9 is a transverse section on line $z\ z$ of Fig. 8.
Figure 10:
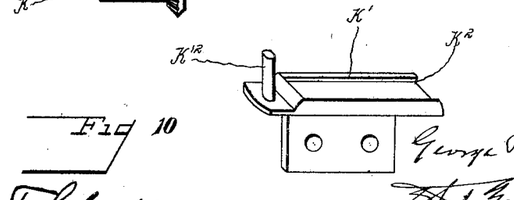
Fig. 10 is a detail of a portion of the same.

$k$ represents a casing in which are mounted any suitable and well-known form of counters, this casing being slidingly mounted in a support, $k^1$, secured to the motor mechanism frame, the support being preferably provided with an under-cut groove-way or track, $k^2$, to receive the base of the casing which is formed to fit the groove-way or track. The counting wheels are revolved through the medium of the beveled gear, $k^3$, located on the end of the case, beveled gear, $k^4$, and the shaft $k^5$, which forms a part of the clock motor mechanism and is driven from the main arbor, $c$, through the medium of the gear $k^6$, pinion $k^7$, gear $k^8$, and pinion $k^9$; the ratio of gearing being such that the shaft, $k^5$, will revolve once each hour. The beveled gear $k^3$ is normally held in engagement with the beveled gear, $k^4$, by the spring, $k^{11}$, connected to the casing and also to the pin, $k^{12}$, on the casing support. Pivotally connected to the casing by a link, $k^{13}$, is a rod $k^{14}$, pivoted to the supporting plate, 2, and having its lower end extended in the path of movement of the main switch. The location of the lower end of the rod with reference to the movable member of the switch is such that when the switch is opened the movable member will strike the rod and thus move the casing in its supporting track so as to disengage the beveled gears, thus stopping the counting mechanism. When the switch closes the spring, $k^{11}$, will draw the casing back again to its normal position and reëngage the gearing and thus start the counting mechanism. It will thus be seen that the counting wheels will be in driving relation with the motor only at such times as the main switch is closed and will register the number of hours the lights are on.

Having thus described my invention, I claim:

1. In a device of the character described, a main switch, electrically operated devices for opening and closing said main switch, an electric circuit for said devices, a time-controlled mechanism, an auxiliary switch located in said circuit, said auxiliary switch comprising contacts supported independently of said time-controlled mechanism, and means controlled by said time-controlled mechanism for closing said contacts to cause the operation of said electrically operated devices and to also cause the contacts of said auxiliary switch to immediately open said circuit entirely independent of the operation of said electrically operated devices, substantially as specified.

2. In a device of the character described, a main switch, electrically operated devices for opening and closing said switch, an electric circuit for said devices, a time-controlled mechanism, two auxiliary switches located in different branches of said circuit, each of said auxiliary switches comprising contacts supported independently of said time-controlled mechanism, and means controlled by said time-controlled mechanism to alternately close the contacts of each of said auxiliary switches at predetermined times to close said circuit to cause the operation of the said electrically operated device to open or close said main switch and to also cause the contacts of the auxiliary switch so closed to immediately open said circuit by an operation entirely independent of the operation of the electrically operated devices, substantially as specified.

3. In a device of the character described, a main switch, electrically-operated devices for opening and closing said switch, an electric circuit for said devices, intermediate connections between said devices and switch normally disconnected from said devices, two auxiliary switches located in different branches of said circuit, a timing mechanism, means controlled by said timing mechanism for alternately closing said auxiliary switches at predetermined intervals to cause said devices to operate and to cause said auxiliary switches to immediately open independently of the operation of said electrically operated devices, and means upon the closing of either one of said auxiliary switches for connecting either one of said intermediate connections with said electrically-operated devices, substantially as specified.

4. In a device of the character described, a main switch, electrically operated devices, an electric circuit for said devices, a time-controlled mechanism, two auxiliary switches located in the said circuit, each of said auxiliary switches comprising contacts supported independently of said time-controlled mechanism, and means controlled by said time-controlled mechanism to close the contacts of one of said auxiliary switches to cause said electrically operated devices to close the main switch and also for causing the contacts of the other auxiliary switch to close to cause said electrically operated devices to open said switch, and to also cause the contacts of each auxiliary switch to immediately open said circuit entirely independently of the operation of the electrically operated devices.

5. In a device of the character described, a main switch, electrically-operated devices normally disconnected from said switch, an electric circuit for said devices, two auxiliary switches located in said circuit, means for alternately closing said auxiliary switches to operate said electrically-operated devices and for opening same, and means for connecting said main switch with said electrically-operated devices, substantially as and for the purpose specified.

6. In a device of the character described, a main switch, electrically-operated devices normally disconnected from said switch, two intermediate connecting devices attached to said switch, two auxiliary switches located in the same circuit with said electrically-operated devices, means for alternately closing said auxiliary switches at predetermined times to operate said electrically-operated devices and for opening same, and means operated by the closing of either of said auxiliary switches for connecting one of said intermediate devices with said electrically-operated devices, substantially as specified.

7. In a device of the character described, a main switch, electrically-operated devices normally disconnected from said main switch, two auxiliary switches located in the same circuit with said electrically-operated devices, means for alternately closing said auxiliary switches at predetermined intervals and causing the same to immediately open, two intermediate connecting devices attached to said main switch, and means operated by the closing of either one of said auxiliary switches for connecting one of said intermediate connecting devices with said electrically-operated devices to cause said devices to close or open said main switch, and means for disconnecting said intermediate device from said electrically-operated devices after the said main switch has been opened or closed, substantially as specified.

8. In a device of the character described, a main switch, electrically-operated devices for opening or closing said switch, and two auxiliary switches located in the same circuit with said electrically-operated devices, each of said auxiliary switches comprising two pivoted arms, and means for alternately raising and permitting said arms to drop at predetermined intervals, said arms being adapted to contact during the dropping movement of either one of them so as to momentarily close the circuit, substantially as specified.

9. In a device of the character described, a main switch, electrically-operated devices for opening and closing said switch, and two auxiliary switches located in the same circuit with said electrically-operated devices, each of said auxiliary switches comprising two pivoted arms, the outer end of one of said arms being bifurcated, means for raising and alternately causing said arms to drop at predetermined intervals, the outer ends of said arms being located in the same path of movement to cause the end of one of said arms to pass between the bifurcated portion of the other arm to momentarily close the circuit, substantially as specified.

10. In a device of the character described, a main switch, electrically-operated devices for opening and closing said switch, and two auxiliary switches located in the same circuit with said electrically-operated devices, each of said switches comprising two pivoted arms, the free ends of said arms lying in the same path of movement, a spring for each arm, means for raising said arms against the tension of said spring and alternately causing the same to drop at predetermined intervals to cause the same to contact and momentarily close the circuit through said electrically-operated devices, substantially as specified.

11. In a device of the character described, a main switch, electrically-operated devices for opening and closing said main switch, a timing mechanism, two auxiliary switches, each of said auxiliary switch comprising contacts supported independently of said timing mechanism, located in a branch of the same circuit with said electrically-operated devices, and means controlled by said timing mechanism for alternately closing the contacts of each of said auxiliary switches and causing said contacts to immediately open, substantially as specified.

12. In a device of the character described, a main switch, electrically operated devices for opening and closing said switch, two auxiliary switches, each of said auxiliary switches being located in a separate branch of the same circuit with said electrically-operated devices, two intermediate connecting devices attached to said main switch, means for alternately momentarily closing said auxiliary switches, and means operated by the closing of the auxiliary switch to connect the intermediate device corresponding thereto with the electrically-operating devices, substantially as specified.

13. In a device of the character described, a main switch, electrically-operated devices for opening and closing said switch, two auxiliary switches, each of said auxiliary switches being located in a separate branch of the same circuit with said electrically-operated devices, each of said switches comprising two pivoted arms adapted when released to swing by each other and momentarily establish a circuit, two rotatable members carrying projections to contact and carry said arms to initial position, said projections being adapted at predetermined intervals to alternately release said arms, substantially as specified.

14. In a device of the character described, a main switch, electrically-operated devices for opening and closing said switch, intermediate connections between said main switch and said electrically-operated devices normally disconnected from said devices, two auxiliary switches located in different branches of the same circuit with said electrically-operated devices, said auxiliary switches each comprising two pivoted arms adapted to swing alternately toward each other and form a momentary contact to close said circuit, rotating members, two for each auxiliary switch, carrying projections to contact with said arms and carry them to swinging position, means for causing said projections to alternately release said arms at predetermined intervals, and means operated by the movement of the respective arms of each switch for connecting said intermediate connections with said electrically-operating devices, substantially as specified.

15. In a device of the character described, a main switch, electrically-operated devices for opening and closing said switch, intermediate connections attached to said main switch, two auxiliary switches located in different branches of the same circuit with said electrically-operated devices, each of said auxiliary switches comprising two pivoted arms adapted to swing toward each other to make a contact and establish the circuit, rotatable gears one for each arm, projections on said gears to engage said arms and carry them to swinging position, and a timing mechanism for revolving said gears to cause said projections to release said arms at predetermined intervals of time, substantially as specified.

16. In a device of the character described, a main switch, electrically-operated devices for opening and closing said switch, two auxiliary switches each located in a different branch of the same circuit with said electrically-operated devices, each of said auxiliary switches comprising two pivoted arms adapted to alternately swing toward each other to contact and form a circuit, a gear wheel for each arm, means for revolving each of said gears once every fourteen days, a series of seven equi-distant projections on each gear wheel, said arms lying in the path of movement of said projections so as to be carried therefrom to a certain point and released thereby at a predetermined time, substantially as specified.

17. In a device of the character described, a main switch, a pivoted operating lever, an electrically-operated device connected to one end of said lever, together with means for periodically causing said device to move said lever, two tilting frames or casings carrying connections to said main switch, located near the other end of said lever, and means when said electric device is energized for tilting either one of said frames to cause the connection carried thereby to become engaged with the end of said lever and be operated thereby, and a spring for returning said lever and electrically-operated device to normal position, substantially as specified.

18. In a device of the character described, a main switch, electrically-operated devices for opening and closing said switch, a timing motor having a rotatable arbor, two auxiliary switches located in the same circuit with said electrically-operated devices, each of said auxiliary switches comprising contacts supported independently of said timing mechanism, rotatable members for each auxiliary switch, two pinions on said arbor geared respectively to the rotatable members, means secured to said arbor for driving said pinions in one direction of rotation only of said arbor, means for preventing backward rotation of said pinions, and means on said arbor for winding said motor, substantially as specified.

19. In a machine of the character described, a main switch, electrically-operated devices, intermediate connections between said devices and said switch, a timing motor, two auxiliary switches controlled by said timing motor for operating said devices and also connecting said intermediate connections therewith, and a secondary auxiliary switch also controlled by said motor for operating said devices at given intervals, and a connection between said devices and said motor for winding the same at each operation of said devices, substantially as specified.

20. In a device of the character described, a main switch, electrically-operated devices for opening and closing said switch, two auxiliary switches located in different branches of the same circuit with said devices, each of said auxiliary switches comprising two pivoted contacts, a rotatable member for each contact adapted to carry same to a certain point and release same at a predetermined time, and a timing mechanism for rotating said members, said timing mechanism comprising a rotatable arbor, two loose sleeves on said arbor, each of said sleeves having a pinion geared to the respective rotatable members of each switch, a third sleeve carrying a ratchet wheel also loosely mounted on said arbor, means for clamping all of said sleeves together, and a pawl secured to said arbor and engaging said ratchet, substantially as specified.

In testimony whereof, I have hereunto set my hand this 30th day of October 1908.

GEORGE R. CLARK.

Witnesses:
SAMUEL B. RICKETTS,
A. R. WOLFF.

Copies of this patent may be obtained for five cents each, by addressing the "Commissioner of Patents, Washington, D. C."